United States Patent
Anderson et al.

(10) Patent No.: US 6,880,113 B2
(45) Date of Patent: Apr. 12, 2005

(54) CONDITIONAL HARDWARE SCAN DUMP DATA CAPTURE

(75) Inventors: Gary D. Anderson, Austin, TX (US); Stephanie M. Forsman, Rochester, MN (US); Alongkorn Kitamorn, Austin, TX (US); Michael Y. Lim, Leander, TX (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 09/848,167

(22) Filed: May 3, 2001

(65) Prior Publication Data

US 2002/0166083 A1 Nov. 7, 2002

(51) Int. Cl.⁷ ................................................ G06F 11/00
(52) U.S. Cl. ........................................ 714/45; 714/37
(58) Field of Search ............................ 714/31, 37, 45, 714/48

(56) References Cited

U.S. PATENT DOCUMENTS

| | | | | |
|---|---|---|---|---|
| 5,119,377 A | * | 6/1992 | Cobb et al. ................... | 714/38 |
| 5,533,193 A | * | 7/1996 | Roscoe .......................... | 714/39 |
| 6,105,150 A | * | 8/2000 | Noguchi et al. ............... | 714/44 |
| 6,182,243 B1 | * | 1/2001 | Berthe et al. .................. | 714/38 |
| 6,708,291 B1 | * | 3/2004 | Kidder .......................... | 714/39 |

* cited by examiner

Primary Examiner—Robert Beausoliel
Assistant Examiner—Gabriel L. Chu
(74) Attorney, Agent, or Firm—Cardinal Law Group; Mark E. McBurney

(57) ABSTRACT

A computer for implementing a method for conditionally capturing hardware scan dump data to minimize the reboot recovery time employs a service processor operable to detect a failure of another hardware component of the computer. Upon detection, the service processor will conditionally capture hardware scan dump data. The first condition for capturing hardware scan dump data is the service processor being activated into an active storing mode of operation labeled "Always". The second condition for capturing hardware scan dump data is the service processor being activated to a reactive storing mode of operation labeled "As Needed" and the error causing the operational failure being a type of error where hardware scan dump data is needed or desired by a system engineer in correcting the operational failure. By conditionally capturing hardware scan dump data, the amount of data being processed over multiple failures of the computer is minimized.

6 Claims, 5 Drawing Sheets

| ERROR SUBCLASS | ERROR DESCRIPTION | BIT OF ERROR DATA SIGNAL |
|---|---|---|
| CLASS 2A | HARDWARE HANG/HANG RECOVERY FAILURE | 20 (SET STATE) |
| CLASS 2B | HARDWARE DESIGN | 21 (SET STATE) |
| CLASS 2C | SOFTWARE/FIRMWARE DESIGN | 22 (SET STATE) |
| CLASS 2D | SOFTWARE/FIRMWARE ILLEGAL OPERATION | 23 (SET STATE) |
| CLASS 2E | INVALID ERROR CONDITIONS | 24 (SET STATE) |

FIG. 5

CONDITIONAL HARDWARE SCAN DUMP DATA CAPTURE

BACKGROUND OF THE INVENTION

1. Field of the Invention

The present invention generally relates to computer systems having self-diagnosis capabilities for responding to system failures. The present invention specifically relates to minimizing reboot recovery time for such computer systems.

2. Description of the Related Art

A computer system with a high availability requirement is designed and manufactured with high quality standards to operate twenty-four hours a day for seven days a week (e.g., a server computer in a highly distributed environment). In the event of a system failure, the computer system is required to reboot and resume operation as fast as possible to sustain the high availability requirement. Accordingly, the computer system is typically designed with a self-diagnosis capability, such as a First Failure Data Capture capability, which captures error data for self-diagnosis and pinpoints failing hardware component(s). In addition, the system also captures hardware scan dump data (i.e., hardware states, traces, error data, etc.) at the time of system failure whereby a system engineer can ascertain the basis of the system failure when the computer system can't determine the basis of the system failure.

Since the amount of data increases as systems become more complex, the time needed to capture the hardware scan dump data at a time of system failure can significantly delay a rebooting of the computer system. Particularly, large, powerful, and complex computer systems may require significant time for recovery. What is therefore needed is a method and a system for minimizing reboot recovery time for large, powerful, and complex computer systems.

SUMMARY OF THE INVENTION

The present invention relates to a method and system to conditionally capture hardware scan dump data upon system failure to minimize system recovery time. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a method for conditionally capturing hardware scan dump data related to an operational failure of a computer. Data indicative of an error causing the operational failure is received. An error table is searched for a listing of the error as indicated by the data signal. The hardware scan dump data is captured when the error is listed on the error table.

A second form of the present invention is a service processor for conditionally capturing hardware scan dump data related to an operational failure of a computer. The service processor comprises a pair of modules and a storage device. The first module is operable to receive a data signal indicative of an error that caused the operational failure of the computer. The storage device stores an error table listing error types that can cause specific operational failures of the computer. The second module is operable to capture the hardware scan dump when an error type corresponding to the error is listed on the error table.

A third form of the present invention is computer program product in a computer readable medium for conditionally capturing hardware scan dump data related to an operational failure of a computer. The computer program product comprises computer readable code for receiving a data signal indicative of an error that caused the operational failure of the computer, computer readable code for searching an error table for a listing of an error type corresponding to the error indicated by the data signal, and computer readable code for capturing the hardware scan dump data when the error type is listed on the error table.

A fourth form of the present invention is a computer comprising a hardware component and a service processor. The hardware component is operable to provide a data signal indicative of an error causing an operational failure of said hardware component. The service processor stores an error table listing error types that can cause specific operational failures of said hardware component, wherein, in response to a reception of said data signal, the service processor is operable to capture hardware scan dump data related to the operational failure when an error type corresponding to the error is listed on the error table.

The foregoing forms and other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 5 illustrates an exemplary error table in accordance with the present invention.

DETAILED DESCRIPTION OF THE PREFERRED EMBODIMENTS

Figure 1:
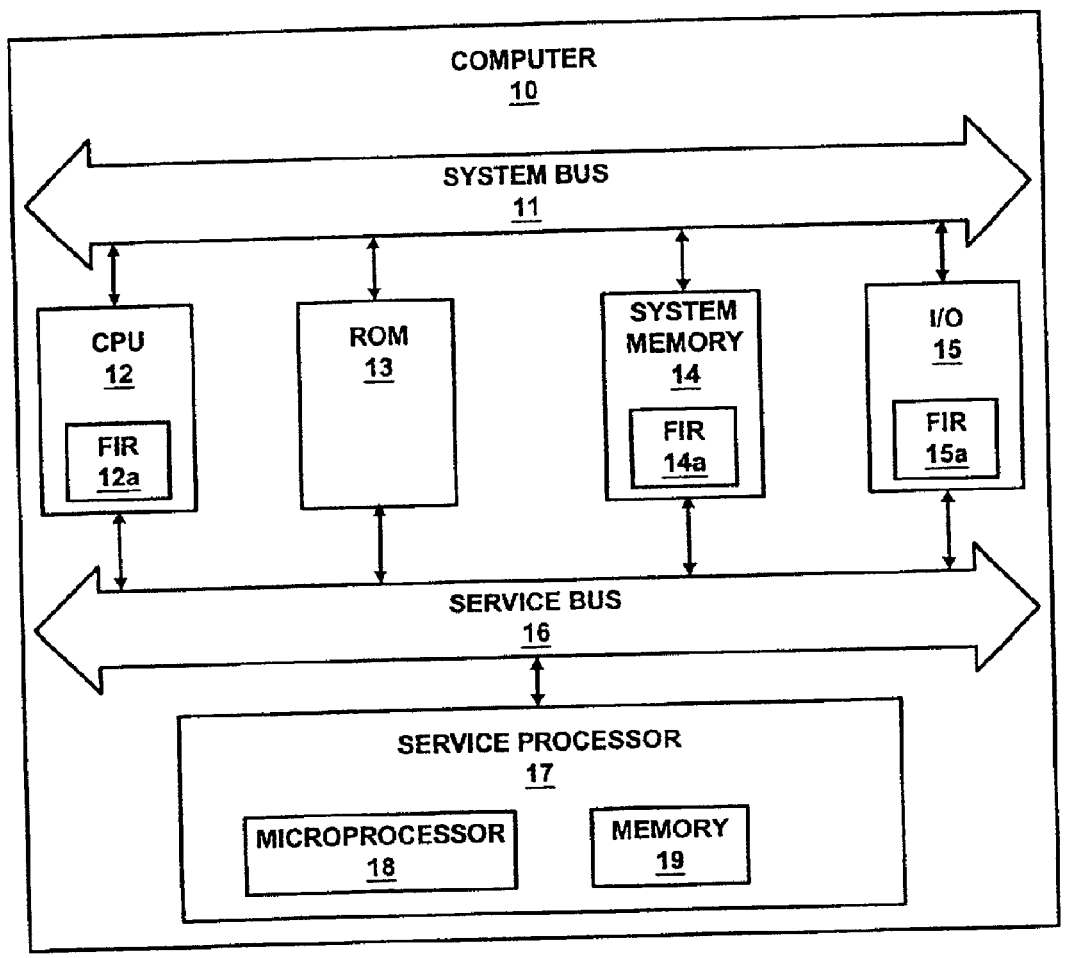
FIG. 1 is a block diagram of one embodiment of computer hardware employed in the present invention.

Referring to FIG. 1, a computer 10 is shown. Computer 10 may be configured in any form for accepting structured inputs, processing the inputs in accordance with prescribed rules, and outputting the processing results as would occur to those having ordinary skill in the art, such as, for example, a personal computer, a workstation, a super computer, a mainframe computer, a minicomputer, a super minicomputer, and a microcomputer. The subsequent description herein of the hardware components of computer 10 is for purposes of providing a description of the principles of the present invention whereby those having ordinary skill in the art will appreciate the applicability of the principles of the present invention to any computer. Computer 10 includes a system bus 11 for facilitating electrical communication among a central processing unit (CPU) 12, a read-only memory (ROM) 13, a system memory 14, and an input/output controller (I/O) 15. CPU 12 preferably includes a microprocessor (not shown) from one of the Intel families of microprocessors, one of the Motorola families of microprocessors, or one of the various versions of a Reduced Instruction Set Computer microprocessor such as the PowerPC chip manufactured by IBM. ROM 13 stores various system specific firmware such as the Basic InputOutput System (BIOS) developed by IBM. System memory 14 includes a memory controller and a random access memory for loading the operating system and selectively loading the controlling programs. I/O 15 is an aggregate of controllers for facilitating an interaction between CPU 12 and inputs devices such as a mouse and a keyboard, and between CPU 12 and output devices such as a disk drive, a printer and a fax.

CPU 12 includes a fault isolation register (FIR) 12a for capturing error data upon an operational failure of CPU 12 with the error data being indicative of the type of operational failure of CPU 12. System memory 14 includes a fault isolation register (FIR) 14a for capturing error data upon an operational failure of system memory 14 with the error data being indicative of the type of operational failure of system memory 14. I/O 15 includes a fault isolation register (FIR) 15a for capturing error data upon an operational failure of I/O 15 with the error data being indicative of the type of operational failure of I/O 15.

Figure 2:
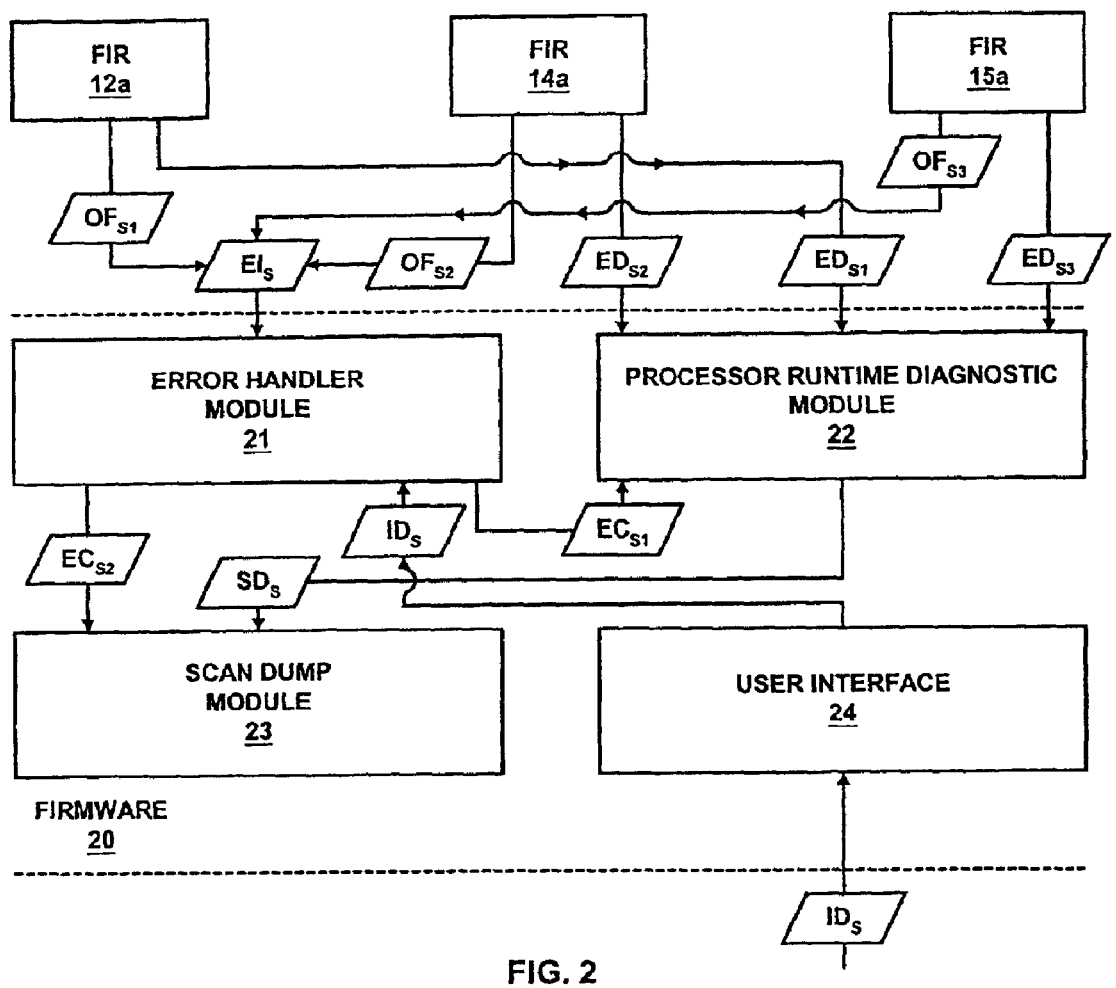
FIG. 2 is a block diagram of one embodiment of computer firmware employed in the present invention.

Computer 10 further includes a service bus 16 for facilitating electrical communication of a service processor 17 with FIR 12a, FIR 14a, and FIR 15a. Service processor 17 has an embedded microprocessor 18 from one of the Intel families of embedded microprocessors, one of the Motorola families of microprocessors, or one of the various versions of a Reduced Instruction Set Computer embedded microprocessor such as the PowerPC chip manufactured by IBM. Service processor 17 also has a memory 19 as a computer readable medium for electrically, magnetically, optically or chemically storing service processor firmware 20 (FIG. 2). In other embodiments of service processor 17, firmware 20 may be fully or partially implemented with digital circuitry, analog circuitry, or both.

Figure 3:
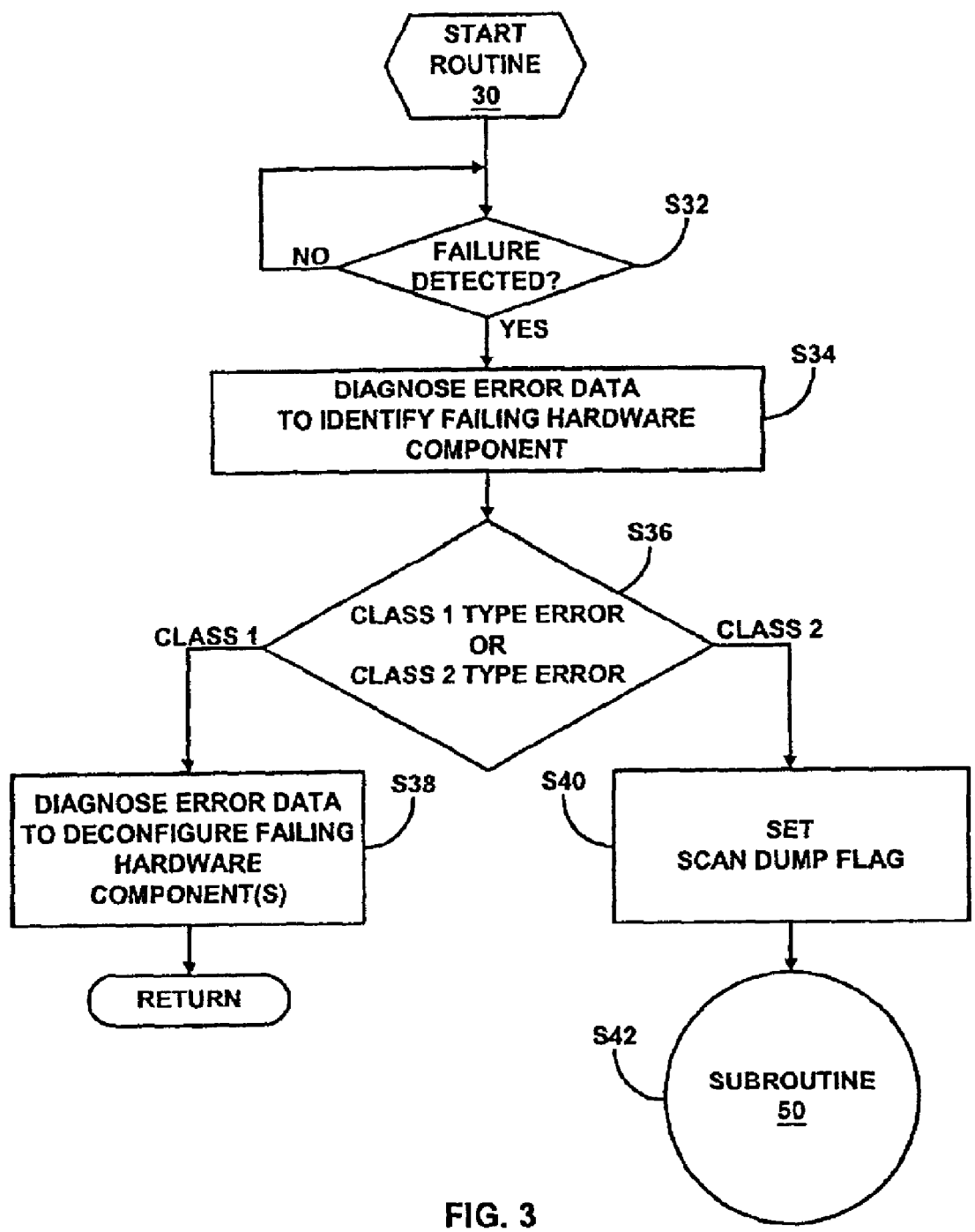
FIG. 3 is a flow chart of one embodiment in accordance with the present invention of a failure response routine implemented by the FIG. 2 computer firmware.
Figure 4:
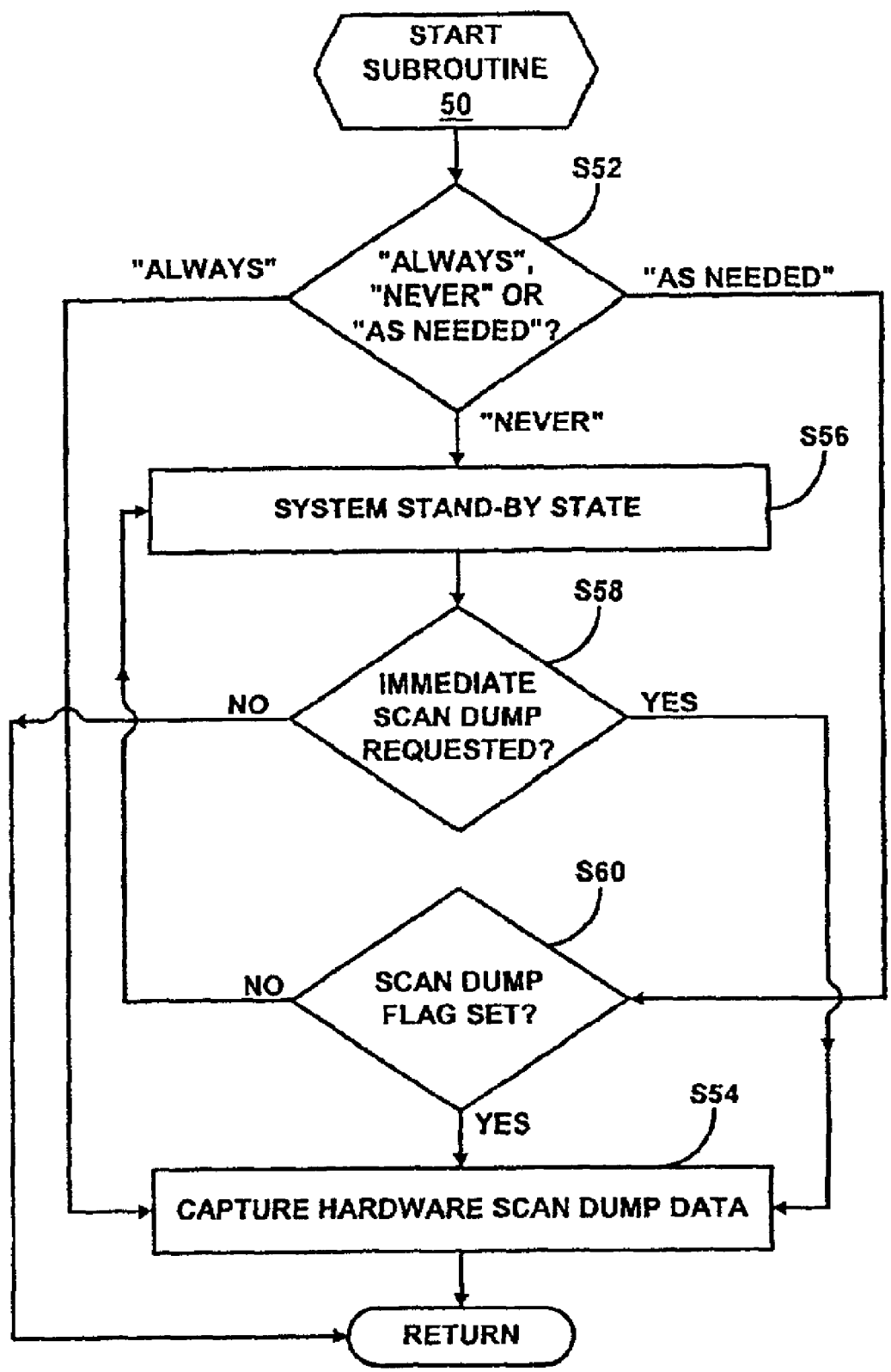
FIG. 4 is a flow chart of one embodiment in accordance with the present invention of a scan dump subroutine implemented by the FIG. 2 computer firmware.

Referring additionally to FIG. 2, an interaction of firmware 20 with FIR 12a, FIR 14a, and FIR 15a is shown. Firmware 20 runs on service processor 17 and includes an error handler (EH) module 21, a processor runtime diagnostic (PRD) module 22, a scan dump (SD) module 23 and a user interface 24 for implementing a failure response routine 30 as shown in FIG. 3 and a scan dump subroutine 50 as shown in FIG. 4. While a functional description of firmware 20 will now be described herein by the description of data transfers and signal transmissions, those having ordinary skill in the art will appreciate the physical elements of various embodiments of service processor 17 that are associated with such data transfers and signal transmissions.

Referring to FIGS. 2 and 3, during a stage S32 of routine 30, EH module 21 determines if CPU 12, system memory 14, or I/O 15 is experiencing an operational failure. In one embodiment, FIR 12a provides an operational failure signal $OF_{S1}$ in a reset state when CPU 12 is properly functioning, and in a set state when CPU 12 is experiencing an operational failure. FIR 14a provides an operational failure signal $OF_{S2}$ in a reset state when system memory 14 is properly functioning, and in a set state when system memory 14 is experiencing an operational failure. FIR 15a provides an operational failure signal $OF_{S3}$ in a reset state when I/O 15 is properly functioning, and in a set state when I/O 15 is experiencing an operational failure.

EH module 21 receives an error interrupt signal $EI_S$ that indicates whether CPU 12, system memory 14, or I/O 15 is experiencing an operational failure. Error interrupt signal $EI_S$ is in a reset state when operational failure signals $OF_{S1-S3}$ are all in a reset state. In response thereto, EH module 21 determines computer 10 is properly functioning and proceeds to repeat stage S32. Error interrupt signal $EI_S$ is in a set state when one or more operational failure signals $OF_{S1-S3}$ are in a set state. In response thereto, EH module 21 calls upon PRD module 22, via an error call signal $EC_{S1}$, to execute stage S34 of routine 30.

During stage S34, PRD module 22 diagnoses error data to identify CPU 12, system memory 14, or I/O 15 as the component of computer 10 experiencing the operational failure. In one embodiment, when CPU 12 is experiencing an operational failure, FIR 12a provides an error data signal $ED_{S1}$ to PRD module 22 that is indicative of the type of error causing the operational failure of CPU 12. When system memory 14 is experiencing an operational failure, FIR 14a provides an error data signal $ED_{S2}$ to PRD module 22 that is indicative of the type of error causing the operational failure of system memory 14. When I/O 15 is experiencing an operational failure, FIR 15a provides an error data signal $ED_{S3}$ to PRD module 22 that is indicative of the type of error causing the operational failure of I/O 15. Upon receipt of any of the error data signals $ED_{S1-S3}$, PRD module 22 reads a specified bit range of the received error data signal to identify CPU 12, system memory 14, or I/O 15 as the component of computer 10 experiencing the operational failure.

PRD module 22 thereafter proceeds to a stage S36 of routine 30 to determine whether the error is a class 1 type error or a class 2 type error. A class 1 type error is an error causing an operational failure of a component of computer 10 (FIG. 1) whereby scanning and storing of hardware scan dump data in memory 19 is not needed for a system engineer to determine the cause of the operational failure, such as, for example, a hardware quality error and a hardware reliability error. A class 2 type error is an error causing an operational failure of a component of computer 10 whereby scanning and storing of hardware scan dump data in memory 19 is needed for a system engineer to determine the cause of the operational failure, such as, for example, a hardware hang error, a hardware hang recovery failure error, a hardware design error, a software/firmware design error, a software/firmware illegal operation error, and an invalid operational condition error. PRD module 22 determines the type of error by reading a specified range of bits of the received error data signal and then searching a scan dump error table of class 2 type errors for a bit match over the specified range of bits. An exemplary scan dump error table 70 is shown in FIG. 5. Referring to FIG. 5, class 2 type errors are divided into subclasses 2A–2E with each subclass having a description of the error type as well as a corresponding bit within the received error data signal.

Referring again to FIGS. 2 and 3, PRD module 22 proceeds to a stage S38 of routine 30 when determining during stage S36 that the error is a class 1 type error. During stage S38, PRD module 22 diagnoses the received error data signal to deconfiguring the failing hardware component(s). After completion of stage S38, computer 10 is rebooted and routine 30 returns to stage S32.

PRD module 22 proceeds to a stage S40 of routine 30 when determining during stage S36 that the error is a class 2 type error. PRD module 22 sets a scan dump flag of SD module 23 via a scan dump signal $SD_S$ during stage S40, and EH module 21 calls upon SD module 23, via an error call signal $EC_{S2}$, to execute a scan dump subroutine 50 as shown in FIG. 4 during a stage S42 of routine 30.

Referring to FIGS. 2 and 4, during a stage S52 of routine 50, SD module 23 determines whether SD module 23 is in an active storing mode of operation that is labeled "Always", an inactive storing mode of operation that is labeled "Never", or a reactive storing mode of operation that is labeled "As Needed". In one embodiment, SD module 23 reads a set of policy flags saved in memory 19 (FIG. 1). When the policy flags indicate an "Always" mode of operation of SD module 23 during stage S52, SD module 23 proceeds to a stage S54 of routine 50 to capture hardware scan dump data to thereby store the hardware scan dump data for display and manipulation by a system engineer repairing the operational failure. After completion of stage S54, computer 10 is rebooted and subroutine 50 returns to stage S32 of routine 30 (FIG. 3).

When the policy flags indicate a "Never" mode of operation of SD module 23 during stage S52, service processor 17 (FIG. 1) proceeds to a stage S56 of routine 50 to execute system terminating operations and to set computer 10 (FIG. 1) in a stand-by state. Module 23 thereafter proceeds to a stage S58 of routine 50 to prompt a user of computer 10 via user interface 24 for an immediate scan dump request. An immediate dump signal $ID_S$ is provided to EH module 21 when the user desires to request an immediate scan dump, and module 23 proceeds to stage S54 to capture hardware scan dump data and then return to stage S32. Otherwise, subroutine 50 returns to stage S32 from stage S58.

When the policy flags indicate a "As Needed" mode of operation of SD module 23 during stage S52, SD module 23 proceeds to a stage S60 of routine 50 to check the status of the scan dump flag. If the scan dump flag is in a set state, module 23 proceeds to stage S54 to capture hardware scan dump data and then return to stage S32. If the scan dump flag is in a reset state, module 23 sequentially executes stage S56 and stage S58 as previously described herein. Those having ordinary skill in the art will appreciate that by conditionally capturing hardware scan data needed to analyze the operational failure, the present invention reduces the recovery time and enhances system availability.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for operating a service processor to conditionally capture hardware scan dump data related to an operational failure of a computer, said method comprising the steps of:

receiving a data signal indicative of an error that caused the operational failure of the computer;

searching an error table for a listing of an error type corresponding to the error indicated by the data signal;

determining a storing mode of operation of the service processor among an active storing mode of operation, an inactive storing mode of operation, and a reactive storing mode of operation; and capturing the hardware scan dump data when the error type is listed on the error table and the storing mode of operation is determined to be the reactive storing mode of operation.

2. The method of claim 1, further comprising:

capturing the hardware scan dump data when the storing mode of operation is determined to be die active storing mode of operation.

3. A service processor for conditionally capturing hardware scan dump data related to an operational failure of a computer, said service processor comprising:

means for receiving a data signal indicative of an error that caused the operational failure of said computer;

means for searching an error table listing error types that can cause specific operational failures of said computer; and a means for determining a staring mode of operation of the service processor among an active storing mode of operation, an inactive storing mode of operation, and a reactive storing mode of operation; and means for capturing the hardware scam dump data when an war type corresponding to the error is listed on the error table and the storing mode of operation is determined to be the reactive storing mode of operation.

4. The service processor of claim 3, further comprising:

means for capturing the hardware scan dump data whim the storing mode of operation is determined to be the active storing mode of operation.

5. A computer program product in a computer readable medium for conditionally capturing hardware scan dump data related to an operational failure of a computer, said computer program product comprising:

computer readable code for receiving a data signal indicative of an error that caused the operational failure of the computer;

computer readable code for searching an error table for a listing of an error type corresponding to the error indicated by the data signal;

computer readable code for determining a storing mode of operation of the service processor among an active storing mode of operation, an inactive storing mode of operation, and a reactive storing mode of operation; and computer readable code for capturing the hardware scan dump data when the error type is listed on the error table and the storing mode of operation is determined to be the reactive storing mode of operation.

6. The computer program product of claim 5, further comprising:

computer readable code for capturing the hardware scan dump data when the storing mode of operation is determined to be the active storing mode of operation.

* * * * *

UNITED STATES PATENT AND TRADEMARK OFFICE
CERTIFICATE OF CORRECTION

PATENT NO. : 6,880,113 B2
DATED : April 12, 2005
INVENTOR(S) : Gary D. Anderson et al.

It is certified that error appears in the above-identified patent and that said Letters Patent is hereby corrected as shown below:

<u>Column 6,</u>
Line 8, should read -- mode of operation is determined to be the active storing --
Line 15, should read -- means for determining a storing mode of operation of the --
Line 24, should read -- means for capturing a hardware scan dump data when --
Line 25, should read -- an error type corresponding to the error is listed on the --
Line 29, should read -- means for capturing the hardware scan dump data when --

Signed and Sealed this

Seventh Day of June, 2005

JON W. DUDAS
*Director of the United States Patent and Trademark Office*